June 12, 1962 K. M. ALLEN ET AL 3,038,589
VIBRATING STRUCTURE
Filed March 27, 1959 2 Sheets-Sheet 2
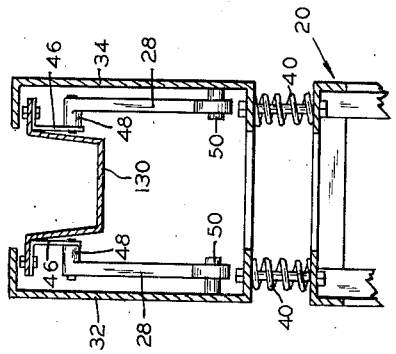
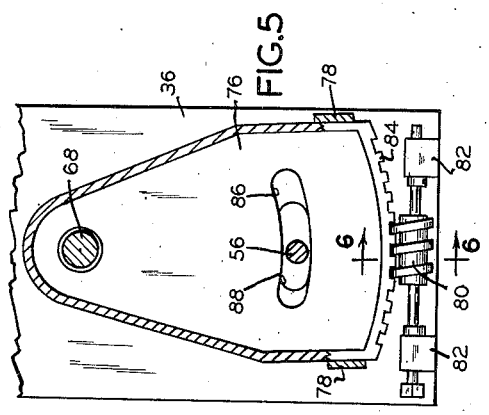
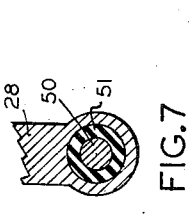
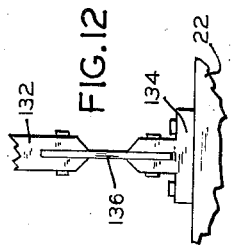
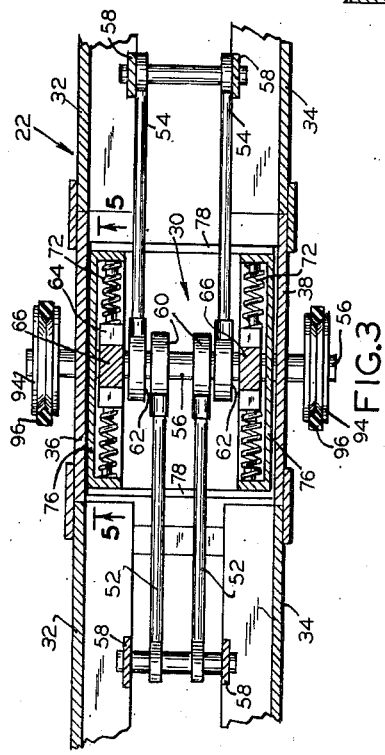
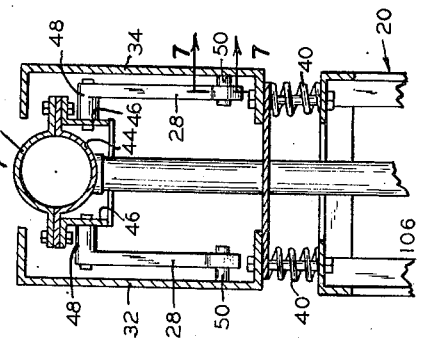
INVENTORS
KENNETH M. ALLEN
CHESTER H. HARPER
BY
BUCKHORN, CHEATHAM & BLORE
ATTORNEYS

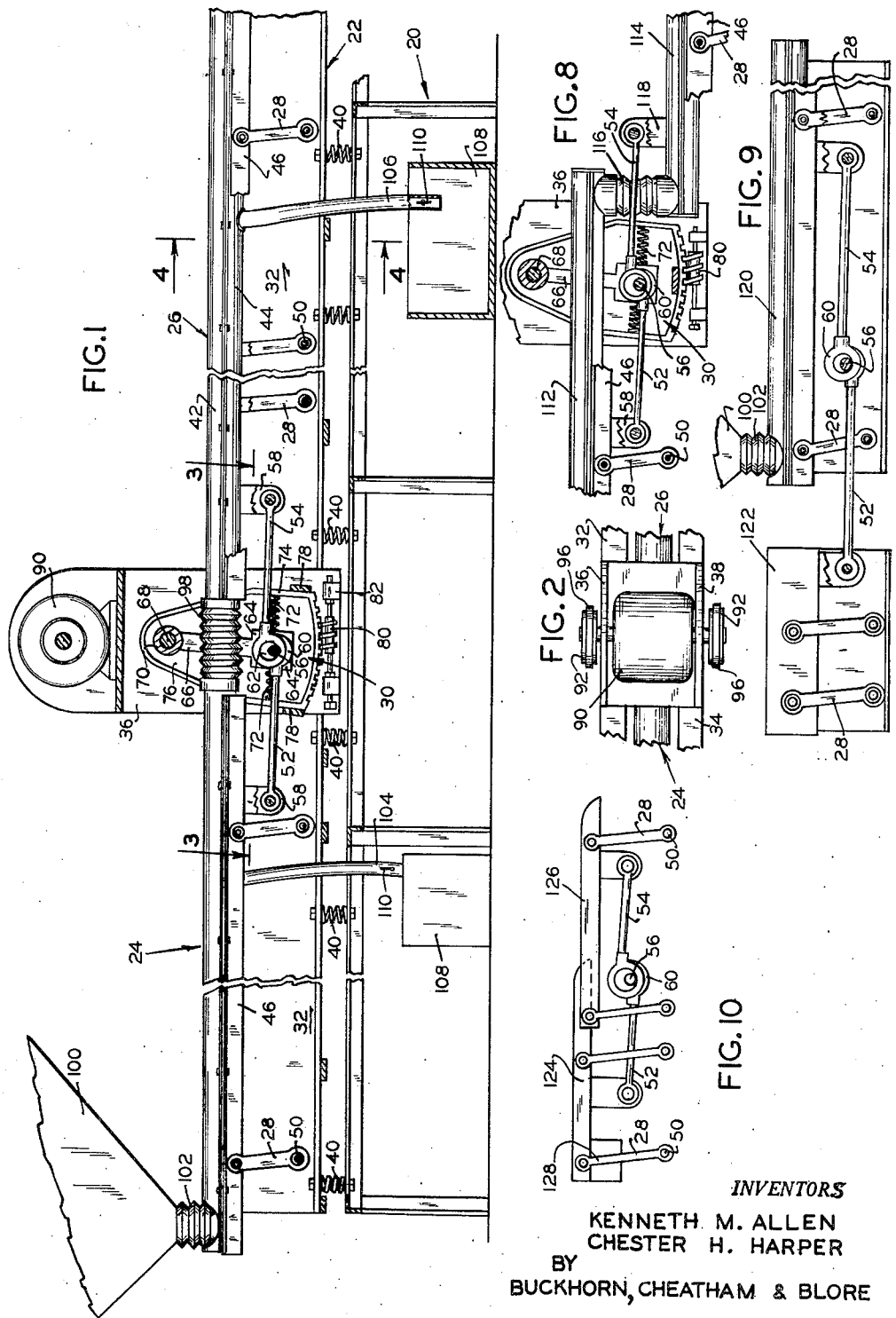

United States Patent Office 3,038,589
Patented June 12, 1962

3,038,589
VIBRATING STRUCTURE
Kenneth M. Allen and Chester H. Harper, Newberg, Oreg., assignors to Allen-Harper, Inc., Portland, Oreg., a corporation of Oregon
Filed Mar. 27, 1959, Ser. No. 802,558
8 Claims. (Cl. 198—220)

This invention relates to a vibrating structure and more particularly to such a structure in which the forces causing vibration or resulting from such vibration are balanced against each other so that substantially no vibration is imparted to the supporting frame for the structure.

In accordance with the present invention, two vibrated members are supported so as to be capable of vibratory motions which are generally parallel to each other. The two vibrated members are driven in opposite directions by connecting rods eccentrically connected to a rotating member. The eccentric connections are diametrically opposed so as to be angularly spaced 180° from each other and the connecting rods extend in opposite directions from the rotating member substantially parallel to each other and to the vibratory motion of the vibrated members. Each connecting rod is connected to one of the vibrated members and the structure just described may be constructed so as to be substantially completely dynamically balanced so far as rotary motion is concerned including the components of rotary motion imparted to the connecting rods. Also the forces due to acceleration of the vibrated members in opposite directions can be made substantially equal and opposite so as to balance each other. Thus all of the forces including those due to reciprocatory vibratory motion of the vibrated members and connecting rods and those due to rotation of the rotary members can be balanced against each other so as to produce substantially no reaction on the frame. This means that substantially no vibration is imparted to the frame.

If the vibrated members which are given reciprocatory vibrating motions are of different masses, then their amplitudes of vibration must be different if the forces causing such motions or resulting from such motions are to be balanced against each other. The present invention provides for reciprocatory vibratory movement of the rotating member in a direction substantially parallel to the direction of reciprocatory vibration of the vibrated members in order to enable the forces resulting from accelerations or decelerations of such vibrated members to be completely balanced against each other. This is accomplished in the present structure by providing a support for the bearings of the rotating member which permit such vibratory motion of the rotating member and its bearing structure. Such vibratory motion of the bearing structure of the rotating member may be resiliently absorbed by resiliently supporting such bearing structure for motion generally parallel to the direction of vibration of the vibrated members. It is unnecessary, however, to provide for vibratory motion of the bearings in a direction at right angles to the vibratory motion of the structure just described.

The result is a vibrating system in which the various forces involved are substantially entirely balanced within the vibrating system itself so that substantially no vibration is imparted to the frame and an extremely smooth running vibrating system, such as one including a pair of vibrating conveyors, is produced. If the masses of the two vibrated members including any loads thereon are equal, there is no motion of the bearings of the rotating member in the direction of vibration of the vibrated members but if the mass of one of the vibrating members becomes greater than the other, for example, by having a heavier load thereon, its vibrating motion is reduced in amplitude and the vibrating motion of the lighter vibrated member is increased in amplitude. Even under these conditions, the motion of the bearings of the vibrating member in the direction of vibration of the vibrated members is the difference between vibratory motion of the two vibrating elements. This difference is always small, since the difference in amplitude between the two vibrated members is only that required to cause the acceleration forces of the two vibrated members to balance each other and such acceleration forces increase with the amplitude of vibration.

The above discussion assumes that the rotating member and its bearings as well as the connecting rods have negligible mass but if such elements do have substantial mass as compared to the masses of the vibrated elements, then the inertia of the rotating member and the portions of the connecting rods adjacent thereto results in forces which resist the movement of the bearings of the rotating member in the direction of vibration of the vibrated members so that the difference in amplitude of vibration of the two vibrated members can be reduced by loading or adding dynamically balanced weight to the rotating member or weight to its bearing structure. Addition of such weight still results in the forces due to such vibration being substantially completely balanced within the vibrating system itself.

The preferred construction of the present invention involves supporting the vibrated elements by a parallel linkage mechanism having links extending in a direction which is very close to being right angles to the direction of vibration of the vibrated members. In the case of vibrated conveyor members, it is well known that the links should, in general, make a slight angle with respect to a perpendicular to the conveying surface. It is also desirable to make this angle adjustable so as to vary the conveying action of the conveyor members and this can be accomplished in the structure of the present invention by making the supports for the bearings of the rotating member adjustable in a direction generally parallel to the direction of vibration of the vibrated members. Thus the bearings for the rotating member may be spring supported so far as motion parallel to the direction of vibration of the vibrated members is concerned and the ends of the springs engaging the frame may be made adjustable relative to the frame in such direction. Such adjustment will change the angle of the links relative to a perpendicular to the direction of vibration of the vibrated members.

The vibrated members may be conveyor members as discussed above or any other members it is desired to vibrate. Conveying members may be either closed conduits or open troughs and may be arranged to have one of the vibrated conveyor members feed into the other vibrated conveyor member. It is possible to weight one of such conveyor elements so as to cut down its feeding action and thus provide a slow feed and make the other conveying member of lighter construction so as to cause it to feed at a greater rate, thus spreading out the material fed from the conveying member having slower speed. In any of the constructions thus described, the forces caused by accelerations of vibrated members are, as discussed above, substantially all absorbed within the vibrating system itself.

It is therefore an object of the present invention to provide an improved vibrating structure in which the accelerating forces required for vibrating a pair of vibrated members are substantially all balanced within the vibrating system itself so that substantially no vibration is imparted to the frame or support for such vibrating system.

Another object of the invention is to provide a vibrating system in which a pair of vibrating members are mounted upon links so as to be vibratable in a direction generally at right angles to the length of the links and in which such vibrated members are vibrated in opposite directions by a balanced eccentric system mounted for limited vibratory motion generally in the direction of vibration of such vibrated members.

Another object of the invention is to provide a vibrating structure in which a rotating member is employed to drive a pair of vibrated members so as to vibrate them in opposite direction with substantially parallel vibrating motion and the bearings for the rotating member are mounted for limited vibratory motion of the vibrated members with such motion of such bearing members being resiliently resisted so as to maintain the axis of said rotary member within predetermined limits.

A further object of the invention is to provide a vibrating system in which a pair of vibrated members are mounted upon parallel links so as to be vibrated in directions which are susbtantially parallel to each other and substantially perpendicular to the length of the links and in which the vibrated members are vibrated in opposite directions by a rotary member eccentrically connected to such vibrated members and movable in the direction of vibration of said vibrated members so as to enable adjustment of the angularity of such links with respect to the direction of vibration of the vibrated members.

Other objects and advantages of the invention will appear in the following description or preferred embodiments in the attached drawings of which:

FIG. 1 is a vertical sectional view of a vibrated conveyor structure in accordance with the present invention taken so as to extend longitudinally of the structure and with certain of the internal parts broken away to show details of the structure;

FIG. 2 is a fragmentary plan view of the center portion of the structure of FIG. 1;

FIG. 3 is a fragmentary horizontal section on a somewhat enlarged scale taken on the line 3—3 of FIG. 1 showing the eccentric mechanism for driving the vibrated members of the present invention;

FIG. 4 is a fragmentary vertical section on such enlarged scale taken on the line 4—4 of FIG. 1;

FIG. 5 is a fragmentary vertical section taken on the line 5—5 of FIG. 3;

FIG. 6 is a fragmentary vertical section taken on the line 6—6 of FIG. 5 and showing a portion of the mechanism for adjusting longitudinally of the vibrating structure the position of the bearing structure for the rotating member;

FIG. 7 is a fragmentary vertical section taken on the line 7—7 of FIG. 4 and showing a resiliently bushed pivotal connection for the ends of the links supporting the vibrated members;

FIG. 8 is a fragmentary view similar to the central portion of FIG. 1, showing a modified vibrated conveyor structure;

FIG. 9 is a view similar to FIG. 8 with certain parts omitted showing a further modified vibrated conveyor structure;

FIG. 10 is a fragmentary view similar to FIG. 9 showing a further modified vibrated conveyor structure;

FIG. 11 is a view similar to FIG. 4 showing a further modified vibrated conveyor structure; and FIG. 12 is a view similar to FIG. 7 showing a modified type of link support usable in the structures of the present invention.

Referring more particularly to the drawings, the vibrated conveyor structure of FIGS. 1 to 7 inclusive, includes a frame 20, a sub frame 22 resiliently supported upon the same frame 20 and a pair of oppositely vibrated conveyor members 24 and 26, each supported upon the sub frame 22 by a plurality of parallel links 28 and vibrated in opposite directions by a vibrating mechanism indicated generally at 30 in a manner providing for adjustment of the angularity of the links 28 relative to the direction of vibration of the vibrated conveyor members and for substantially complete balancing of the reaction forces due to vibration of the conveyor members within the vibrating system.

The frame 20 may be of any desired form and the sub frame 22 may include channel members 32 and 34 extending longitudinally in opposite directions from the vibrating mechanism 30 as most clearly shown in FIG. 4, and upstanding side plates 36 and 38 midway of the length of the structure. The channel members 32 of one side of the sub frame may each be connected at their adjacent ends to the edges of the side plate 36 at one side of the sub frame 32 and the channel members 34 may be connected at their adjacent ends to the edges of the side plate 38 at the other side of the sub frame 22. The entire sub frame 22 may be supported by vertically extending compression springs 40 upon the main frame 20.

The conveyor members 24 and 26 shown in FIGS. 1 and 4 are of tubular construction, each made up of semicircular upper and lower half section 42 and 44, respectively, provided with flanges at their opposite longitudinal edges secured together and to a longitudinally extending reinforcing angle member 46 (FIG. 4) suitably secured together to form a support for the conveyor members. The links 28 each have a pivotal connection 48 at their upper end to the reinforcing members 46 and have a pivotal connection 50 at their lower ends to the lower portions of the channel members 32 and 34. It will be appreciated that the links 28 and their pivotal connections 48 and 50 provide a parallel linkage system for each of the conveyor members 24 and 26. As shown in FIG. 7, each of the pivotal connections for the links preferably includes a bushing 51 of rubber or other resilient material.

The conveyor members 24 and 26 are vibrated in opposite directions by connecting rods 52 and 54 arranged in inner and outer pairs, respectively, as shown most clearly in FIGS. 1 and 3, and extending in parallel relationship in opposite directions from an eccentric shaft 56 so as to be dynamically balanced. The connecting rods each have one end pivotally connected to depending arms 58 secured to the reinforcing members 46 which support the vibrated members. The other ends of the connecting rods 52 and 54 are mounted upon eccentrics 60 and 62 carried by the shaft 56, the eccentrics for the connecting rods 52 and 54 being angularly positioned 180° apart on the shaft 56 and having equal throws. It will be appreciated that rotation of the shaft 56 will vibrate the conveyor members 24 and 26 in opposite directions and that if the total masses of the vibrated members 24 and 26 and the loads therein are the same, the reaction forces due to acceleration of such vibrated members longitudinally thereof will be entirely balanced, such that there will be no resultant forces on the shaft 56 which tends to vibrate the shaft in the direction of vibration of the vibrated members 24 and 26. If one of the vibrated members 24 or 26 has greater mass than the other, the shaft 56 will be vibrated in the direction of vibration of the vibrated members, if free to move, until the reaction forces referred to are again balanced.

In order to provide for movement of the shaft 56 in the direction of vibratory movement of the conveyor members 24 and 26, such shaft is journaled in bearings carried in bearing blocks 64 at the lower ends of depending arms 66 pivotally supported on a cross shaft 68 secured in the upstanding side plates 36 and 38. The two arms 66 on the opposite sides of the vibrating mechanism are connected together by a sleeve 70 journaled on the shaft 68 so that the arms 66 move together. The bearing blocks 64 are each engaged by the ends of a pair of opposed compression springs 72 having their opposite ends engaging a flange portion 74 extending around the periphery of a pivoted member 76 journaled on and depending from the shaft 68. As shown in cross section in FIG. 3, there is a pivoted member 76 on each side of the structure adjacent each of the upstanding plates 36 and 38 and such pivoted members are connected together by transversely extending plates 78 so as to be angularly adjustable simultaneously about the shaft 68.

An adjusting device for the pivoted members 76 is shown in FIGS. 1, 5 and 6 and may include a worm 80 journaled in bearings 82 carried by the plate 36 of the sub frame of the structure and engaging an arcuate rack 84 on the lower end of the pivoted member 76. The pivoted member 76 may thus be pivotally adjusted about the shaft 68 as a center, the pivoted member 76 being shown in one adjusted position in FIG. 1 and in another adjusted position in FIG. 5. The pivoted member 76 is slotted at 86 (FIG. 5) so as to be movable relative to the eccentric shaft 56 and the upstanding side plates 36 and 38 are also slotted at 88 as shown in FIG. 5 to enable vibratory movement of the shaft 56 relative thereto and to the pivotal member 76.

It will be apparent that the angular position of the links 28 will be determined by the angular position of the pivoted members 76. Movement of such pivoted members 76 is transmitted to the bearing blocks 64 through the springs 72 and such movement of the bearing blocks 64 moves the eccentric shaft 56 in a direction longitudinally of the conveyor members 24 and 26 so as to move such conveyor members through the connecting rods, depending members 58 and reinforcing members 46. As shown in FIG. 1, the lower end of the pivoted member 76 has been moved toward the left from a vertical position so that such pivoted member has been rotated in a clockwise direction in such figure from a vertical position about the shaft 68. The links 28 thus have a slight inclination from the vertical toward the left in the figure. It will be apparent that this inclination can be adjusted by turning the worm 80. This will adjust the ratio of the vertical component of vibration of the conveyor members 24 and 26 to the longitudinal component of vibration.

The shaft 56 is driven from a motor 90 supported adjacent the upper end of the ends of the side plates 36 and 38 and between such side plates. A pair of pulleys 92 may be secured to the ends of the motor shaft so that the motor drives the pulleys 94 on the ends of the eccentric shaft 56 through belts 96. The adjacent ends of the conveyor members 24 and 26 may be connected together through a tubular element 98 which is flexible in a direction longitudinally thereof to provide for vibration of the two vibrated elements in opposite directions.

Material to be conveyed by the conveyor members 24 and 26 may be introduced into the inlet end of the conveyor member 24 from a hopper 100 through a flexible connection 102. With the links 28 positioned as shown in FIG. 1, vibration of the conveyor members by rotation of the shaft 56 will cause the material to advance to the right. If desired, material may be discharged at intermediate points along the conveyor system, for example, through the flexible conduits 104 and 106 so as to be discharged into receivers 108. Discharge through such conduits can be controlled or stopped by shut off or valve elements 110. It will be understood that both of the conveyor members may be of considerable length and that each may have several outlet conduits or, on the contrary, the system may discharge only at the remote end of the conveyor member 26.

The operation of the device of FIGS. 1 to 7 should be apparent from the above description. The motor 90 drives the eccentric shaft 56 through pulleys 92 and 94 and belts 96 to rotate such shaft at a high rate of speed. The connecting rods 52 and 54 are thereby reciprocated in opposite directions by reason of the fact that the eccentrics 60 and 62 are angularly positioned with respect to each other 180° apart. The throw of the eccentrics will ordinarily be quite small, for example, in the order of 1/32 to 1/8 of an inch. The reciprocation of the connecting rods vibrates the reinforcing frame including the angle members 46 carrying the conveyor members 24 and 26 so as to impart longitudinal vibration to such conveyor members. If the links 28 are positioned substantially at right angles to the vibrated members 24 and 26, the vibration is along a small arc concentric with the pivotal connections 50 but the vertical component of vibration is slight and is equal for both directions of vibratory movement of the vibrated members.

By adjusting the worm 80, the pivoted members 76 may be angularly adjusted about the shaft 68 and any angular adjustment of such pivoted members 76 is imparted to the bearing blocks 64 for the shaft 56 through the compression springs 72. This moves the eccentric shaft 56 in a direction longitudinally of the vibrated members 24 and 26 to adjust the inclination of the links 28. Such links are shown as having an inclination to the left in FIG. 1, such that the vertical component of motion of the vibrated members is increased and the vibrating members 24 and 26 each has its upward component of vertical motion during its movement to the right in FIG. 1 and its downward component of vertical motion during its movement to the left in FIG. 1. This results in movement of any material being conveyed in the vibrating members 24 and 26 to the right in FIG. 1, such that material can be withdrawn from the hopper 100 through the flexible connection 102 and conveyed to the right through the vibrated conveyor members 24 and 26.

The rotating mechanism including the eccentrics and the portions of the connecting rods which are given a component rotary motion can be constructed to be in dynamic balance, for example, by employing the two pairs of eccentrics illustrated in FIG. 3 and carefully balancing the rotating parts. There is thus substantially no vertical component of vibratory motion tending to move the shaft 56 in a vertical direction. It follows that substantially no vertical component of vibratory motion is imparted to the sub frame of the machine by the rotating parts. If the two vibrated members 24 and 26 are balanced, i.e., have equal weights and have equal loads therein, there are no resultant forces tending to produce vibration of the shaft 56 in the direction of vibration of the conveyor members. If, however, one of the vibrated members becomes greater in weight than the other, for example, by having a greater load therein, the amplitude of longitudinal vibration of such member will tend to become slightly less than that of the other vibrated member. By making provision for the shaft 56 to have slight motion in the direction of vibration of the vibrated members, the relative amplitude of vibration of the two conveyor members can vary and the forces producing vibration of the two vibrated elements can still be balanced against each other. The vibratory motion of the shaft 56 is, however, small under any conditions and very little vibratory forces are imparted to the sub frame 22 from such shaft.

It will be appreciated that the vibratory motion of the conveyor members and any resulting vibration of the shaft 56 and associated parts are along arcs of small length relative to the radius of each of such arcs and that there are small vertical components of vibratory motion which are not balanced, such that slight vertical components of vibration are imparted to the sub frame 22. The springs 40 which resiliently support the sub frame 22 on the main frame 20 are therefore desirable but can be dispensed with without undue vertical vibration being imparted to the main frame. This is true since the major components of vibratory motion are in the direction of the length of the conveyor elements and the forces produced or resulting from such major components are substantially completely balanced within the vibratory system itself as discussed above.

Even if all of the shut offs 110 in the outlet conduits 106 for the vibrated conveyor member 26 are closed and the discharge end of such member is closed so that a load of material is accumulated in such conveyor member, the conveying action still continues in the vibrated conveyor member 24 as long as one of the outlet conduits thereof is open. The accumulation of an excess load in the vibrated conveyor member 26 actually increases the conveying action of the conveyor member 24 but as soon as an outlet 106 for the conveyor member 26 is opened, discharge from such conveyor member again takes place and the conveying actions of the two conveying members again tend to balance. Even when one of the conveying members 26 is thus loaded, movement of the shaft 56 in the direction of vibration of the conveying members is small.

If the conveyor members 24 and 26 of FIG. 1 are operated so that the material being conveyed flows continuously through the flexible member 98 so as not to fill such member, or if the material is easily compressible, the arrangement of FIG. 1 with the conveyor members in axial alignment is entirely satisfactory. If, however, heavier non compressible materials are being conveyed and the conveyor is operated such that the vibrated conveyor member 26 becomes full and the flexible element 98 becomes packed, a high load is developed on the vibrating mechanism and the vibration of the conveyor members may even be stopped. A modified structure is shown in FIG. 8 in which an upper tubular conveyor member 112 discharges into a lower tubular conveyor member 114 through a vertically extending flexible element 116. With any usual type of materials being conveyed, the modification of FIG. 8 will continue to operate even though the flexible element 116 becomes packed full of material. Except that the conveyor member 114 of FIG. 8 is positioned below the conveyor member 112 instead of in alignment therewith, the other structure of a vibrating structure conveyor in accordance with FIG. 8 may be entirely similar to that shown in FIG. 1. The same reference numerals employed in FIG. 1 have therefore been applied to FIG. 8 for the other elements shown in FIG. 8. The only other change indicated is that the members 118 to which the connecting rod 54 is connected extend upwardly from the reinforcing angle elements 46 of the conveyor member 114 instead of downwardly for connection with the connecting rod 54.

A further modification is shown in FIG. 9 in which a single conveyor member 120 is employed and driven through an eccentric shaft of the same type shown in FIGS. 1 and 8. In FIG. 9, the conveyor member 120 is balanced against the weight 122 supported on links 28 in the same manner that the conveyor member 120 is supported on links 28. The bearing blocks and resilient supports for the shaft 56 have been omitted from FIG. 9, but it will be understood that such structure may be entirely similar to that shown in FIGS. 1 and 8. The conveyor 120 may be fed from a hopper 100 through a flexible element 102 and it will be apparent that if the mass of the weight 122 is made the same as the average mass of the conveyor 120 and its load, very little motion of the shaft 56 in the direction of vibratory motion of the conveyor member will take place.

A further modification of the invention is indicated in FIG. 10 in which a pair of feeding pans 124 and 126 are each mounted on links 28 in the same manner as the conveyor members of FIGS. 1, 8 and 9 and are driven from an eccentric shaft 56 through connecting rods 52 and 54 in the same manner as the conveyor members of FIG. 1. Such shaft will, of course, be resiliently mounted in the same manner as shafts 56 of FIGS. 1 and 8. The pan 124 is partly received within and discharges in the pan 126 and, if desired, the pan 124 may have a weight 128 secured thereto as to slow down the conveying action of such pan and speed up the conveying action of pan 126. The result is that the material will be conveyed relatively slowly by the pan 124 and then speeded up in the pan 126 so as to be spread out into a thinner stream.

A still further modification is shown in FIG. 11 in which a trough shaped conveying member 130 has been substituted for the tubular conveying members of FIGS. 1, 8 and 9 or of FIG. 4, such trough shaped member being received in the reinforcing structure for the conveyor elements including the angle members 46, such angle members being in turn supported on the links 28 in the same manner as in FIGS. 1 and 4. Any other suitable type of conveyor member or vibrated member may be similarly supported and vibrated with the double eccentric vibrator mechanism of the present invention.

Although all of the links shown in the various figures thus far described have included the resiliently bushed link pivots including the bushing 51 of rubber or other resilient materials shown in FIG. 7 as surrounding the pivot pin, other types of link structure may be employed, for example, that shown in FIG. 12 in which a link 132 is connected to a securing element 134, shown as being in turn secured to the sub frame 22 by a flexible element 136. The flexible element 136 may be a flexible sheet of resilient plastic material and it is apparent that such flexible joints may be substituted for the various pivotal connections at the end of the links 28 or for that matter, at the end of the connecting rods connected to the vibrated members and that other supporting arrangements are possible for members which are given reciprocatory vibration in opposite directions.

While we have disclosed the preferred embodiments of our invention, it is understood that the teaching thereof may be varied and the scope of the invention is to be determined by the following claims.

We claim:

1. A vibrating structure comprising a frame, a first vibrated member, means supporting said member on said frame for vibratory motion relative to said frame, a second vibrated member, means supporting said second member on said frame for vibratory motion relative to said frame in a direction generally parallel to the vibratory motion of said first member, a rotating member, bearing means for said rotating member, a first connecting rod on one side of said rotating member and having a first eccentric connection to said rotating member, said connecting rod extending generally parallel to said direction and being connected to said first member, a second connecting rod on the other side of said rotating member and eccentrically connected thereto at a position angularly spaced 180° from said first eccentric connection, said second connecting rod extending oppositely to and parallel to said first connecting rod and being connected to said second member, support means supporting said bearing means in a manner to permit movement of said bearing means relative to said frame generally parallel to said direction, resilient means opposing such movement of said bearing means, and means mounting said resilient means for shifting thereof relative to said frame generally parallel to said direction.

2. A vibrating structure comprising a frame, a first vibrated member, links supporting said member on said frame for vibratory motion relative to said frame, a second vibrated member, links supporting said second member on said frame for vibratory motion relative to said frame in a direction generally parallel to the vibratory motion of said first member, a rotating member, bearing means for said rotating member, a first connecting rod on one side of said rotating member and having a first eccentric connection to said rotating member, said connecting rod extending generally parallel to said direction and being connected to said first member, a second connecting rod on the other side of said rotating member and eccentrically connected thereto at a position angularly spaced 180° from said first eccentric connection, said second connecting rod extending oppositely to and parallel to said first connecting rod and being connected to said second member, support means on said frame for said bearing means including means for preventing vibratory motion of said bearing means relative to said frame at right angles to said direction and permitting movement of said bearing means relative to said frame generally parallel to said direction, resilient means opposing such movement of said bearing means, and means adjustably mounting said resilient means for movement thereof relative to said frame generally parallel to said direction.

3. A vibrating structure comprising a frame, a first vibrated member, a parallel linkage mechanism supporting said member on said frame for vibratory motion relative to said frame, a second vibrated member, a parallel linkage mechanism for supporting said second member on said frame for vibratory motion relative to said frame in a direction generally parallel to the vibratory motion of said first member, a rotating member, bearing means for said rotating member, a first connecting rod on one side of said rotating member and having a first eccentric connection to said rotating member, said connecting rod extending generally parallel to said direction and being connected to said first member, a second connecting rod on the other side of said rotating member and eccentrically connected thereto at a position angularly spaced 180° from said first eccentric connection, said second connecting rod extending oppositely to and parallel to said first connecting rod and being connected to said second member, support means on said frame for said bearing means including a pivoted support means preventing vibratory motion of said bearing means relative to said frame at right angles to said direction and permitting movement of said bearing means relative to said frame generally parallel to said direction, resilient means between said pivoted support means and said bearing means opposing such movement of said bearing means, and means mounting said resilient means for adjusting movement thereof relative to said frame generally parallel to said direction.

4. A vibrating conveyor structure comprising a frame, a conveyor member, means supporting said member on said frame for vibratory motion generally longitudinally of said member, a second member, means supporting said second member on said frame for vibratory motion relative to said frame in a direction generally parallel to the vibratory motion of said conveyor member, a rotating member, bearing means for said rotating member, a first connecting rod on one side of said rotating member and having a first eccentric connection to said rotating member, said connecting rod extending generally parallel to said direction and being connected to said conveyor member, a second connecting rod on the other side of said rotating member and eccentrically connected thereto at a position angularly spaced 180° from said first eccentric connection, said second connecting rod extending oppositely to and parallel to said first connecting rod and being connected to said second member, support means supporting said bearing means in a manner to permit movement of said bearing means relative to said frame generally parallel to said direction, resilient means opposing such movement of said bearing means, and means mounting said resilient means for adjustment relative to said frame generally parallel to said direction.

5. A vibrating conveyor structure comprising a frame, a first elongated conveyor member, means supporting said member on said frame for vibrating motion generally longitudinally of said member, a second elongated conveyor member extending generally parallel to said first conveyor member and positioned to receive material being conveyed from said first conveyor member, means supporting said second member on said frame for vibratory motion generally in a direction generally parallel to the vibratory motion of said first member, a rotating member, bearing means for said rotating member, a first connecting rod on one side of said rotating member and having a first eccentric connection to said rotating member, said connecting rod extending generally parallel to said direction and being connected to said first member, a second connecting rod on the other side of said rotating member and eccentrically connected thereto at a position angularly spaced 180° from said first eccentric connection, said second connecting rod extending oppositely to and parallel to said first connecting rod and being connected to said second member, support means supporting said bearing means in a manner to permit movement of said bearing means relative to said frame generally parallel to said direction, resilient means opposing such movement of said bearing means, an assembly pivotally mounted on said frame adjacent said support means for swinging movement in the direction of said vibrating motion, resilient means between said assembly and said bearing means opposing vibratory movement of said bearing means, and means adjustably to move said assembly about its pivotal axis.

6. A vibrating structure comprising a frame, a first vibrated member, links supporting said member on said frame for vibratory motion relative to said frame, a second vibrated member, links supporting said second member on said frame for vibratory motion relative to said frame in a direction generally parallel to the vibratory motion of said first member, a rotating member, bearing means for said rotating member, a first connecting rod on one side of said rotating member and having a first eccentric connection to said rotating member, said connecting rod extending generally parallel to said direction and being connected to said first member, a second connecting rod on the other side of said rotating member and eccentrically connected thereto at a position angularly spaced 180° from said first eccentric connection, said second connecting rod extending oppositely to and parallel to said first connecting rod and being connected to said second member, support means on said frame for said bearing, an assembly movably mounted on said frame for movement generally parallel to said direction with respect to said frame, resilient means imposed between said assembly and said support means for opposing the vibratory motion of said bearing means, and means to adjust the relative position of said assembly and said frame in said direction.

7. A vibrating structure comprising a frame, a first elongated tubular conveyor member having an inlet end and an outlet end, links supporting said member on said frame for vibratory motion generally longitudinally of said member relative to said frame, a second elongated tubular conveyor member having an inlet end adjacent the output end of said first member and extending in parallel relationship from said first member, tubular flexible connecting means for delivering material being conveyed from the outlet end of said first member to the inlet end of said second member, links supporting said second member on said frame for vibratory motion relative to said frame in a direction generally parallel to the vibratory motion of said first member, a rotating member, bearing means for said rotating member, a first connecting rod on one side of said rotating member and having a first eccentric connection to said rotating member, said connecting rod extending generally parallel to said direction and being connected to said first member, a second connecting rod on the other side of said rotating member and eccentrically connected thereto at a position angularly spaced 180° from said first eccentric connection, said second connecting rod extending oppositely to and parallel to said first connecting rod and being connected to said second member, support means on said frame for said bearing means in a manner preventing vibratory motion of said bearing means relative to said frame at right angles to said direction while permitting limited vibratory motion of said bearing means generally parallel to said direction, spring mounting means movably mounted on said frame and mounting a pair of opposed springs which bear against said bearing means to oppose such vibratory motion of said bearing means, and means adjustably to position said spring mounting means relative to said frame in said direction.

8. A vibrating structure comprising a frame, a first elongated conveyor member, links supporting said member on said frame for vibratory motion relative to said frame, a second conveyor member receiving material being conveyed from said first member, links supporting said second member on said frame for vibratory motion relative to said frame in a direction generally parallel to the vibratory motion of said first member, a rotating member, bearing means for said rotating member, a first connecting rod on one side of said rotating member and having a first eccentric connection to said rotating member, said connecting rod extending generally parallel to said direction and being connected to said first member, a second connecting rod on the other side of said rotating member and eccentrically connected thereto at a position angularly spaced 180° from said first eccentric connection, said second conneting rod extending oppositely to and parallel to said first connecting rod and being connected to said second member, and support means on said frame for said bearing means including resilient means between said bearing means and said support means providing limited vibratory motion of said bearing means generally parallel to said direction, said support means including pivoted means having a portion carrying said resilient means and movable generally parallel to said direction to vary the average angular positions of said links relative to said frame.

References Cited in the file of this patent

UNITED STATES PATENTS

| | | |
|---|---|---|
| 2,751,068 | Haddox | June 19, 1956 |
| 2,756,973 | Dostatni | July 31, 1956 |
| 2,872,024 | Sernetz | Feb. 3, 1959 |

FOREIGN PATENTS

| | | |
|---|---|---|
| 1,075,157 | France | Apr. 14, 1954 |
| 713,442 | Great Britain | Aug. 11, 1954 |